US009282858B2

(12) United States Patent
Lee et al.

(10) Patent No.: US 9,282,858 B2
(45) Date of Patent: Mar. 15, 2016

(54) PORTABLE VACUUM WITH A CHARGING BASE AND DUSTPAN MODE

(71) Applicant: SAMSUNG ELECTRONICS CO., LTD., Suwon-si, Gyeonggi-do (KR)

(72) Inventors: Jooyeon Lee, San Jose, CA (US); Katherine Lee, San Jose, CA (US); Sandra Christina Droira, San Jose, CA (US); Joseph Kennelly-Ullman, Seattle, WA (US); Julian Bibl, Seattle, WA (US); Jedidah J. McCann, Seattle, WA (US); Michael Nelson, Seattle, WA (US); Blair J. Erbstoeszer, Seattle, WA (US); Brian Read, Seattle, WA (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 184 days.

(21) Appl. No.: 14/077,760

(22) Filed: Nov. 12, 2013

(65) Prior Publication Data

US 2014/0130293 A1    May 15, 2014

Related U.S. Application Data

(60) Provisional application No. 61/725,930, filed on Nov. 13, 2012.

(51) Int. Cl.
*A47L 9/20* (2006.01)
*A47L 5/22* (2006.01)
*A47L 5/24* (2006.01)
(Continued)

(52) U.S. Cl.
CPC . *A47L 5/225* (2013.01); *A47L 5/24* (2013.01); *A47L 5/28* (2013.01); *A47L 9/0027* (2013.01); *A47L 9/0036* (2013.01); *A47L 9/02* (2013.01); *A47L 9/244* (2013.01); *A47L 9/2873* (2013.01); *A47L 9/2878* (2013.01); *A47L 13/52* (2013.01); *B60S 1/64* (2013.01)

(58) Field of Classification Search
CPC ..... A47L 5/225; A47L 9/0027; A47L 9/0036; A47L 9/244; A47L 9/2873; A47L 9/2878; A47L 7/0085
USPC ............................... 15/319, 328, 352, DIG. 1
IPC ......................................................... A47L 9/10
See application file for complete search history.

(56) References Cited

U.S. PATENT DOCUMENTS

| 4,050,113 | A * | 9/1977 | Wright et al. .......... 15/315 |
| 5,560,077 | A * | 10/1996 | Crotchett ................ 15/339 |
| 6,671,924 | B1 * | 1/2004 | Rood ...................... 15/310 |

(Continued)

*Primary Examiner* — David Redding
(74) *Attorney, Agent, or Firm* — Staas & Halsey LLP

(57) ABSTRACT

A full power portable vacuum cleaner having a charging base which may provide vacuuming function similar to a household dustpan may employ a concealed hose and a retractable cord. To meet various cleaning demands, the vacuum cleaner may operate with different function modes, including the dustpan mode (vacuum through a port at the bottom of the vacuum body) for planar surface vacuuming, and the cordless portable mode for on-spot vacuuming. The vacuum cleaner may further employ multiple power supplies, including an internal battery supply, wall power supply, or car power supply.

14 Claims, 13 Drawing Sheets

(51) Int. Cl.
*A47L 5/28* (2006.01)
*A47L 9/00* (2006.01)
*A47L 9/02* (2006.01)
*A47L 9/24* (2006.01)
*A47L 9/28* (2006.01)
*A47L 13/52* (2006.01)
*B60S 1/64* (2006.01)

(56) References Cited

U.S. PATENT DOCUMENTS 7,779,504 B2 * 8/2010 Lee et al. ............. 15/319
2003/0014831 A1 * 1/2003 Ma ..................... 15/377

* cited by examiner

PORTABLE VACUUM WITH A CHARGING BASE AND DUSTPAN MODE

CROSS-REFERENCE TO RELATED APPLICATIONS

This application claims the benefit of U.S. Provisional Application No. 61/725,930, filed Nov. 13, 2012, in the United States Patent and Trademark Office, the disclosure of which is incorporated herein by reference.

BACKGROUND

1. Field

Embodiments of the present invention relate to a portable vacuum cleaner.

2. Description of the Related Art

Portable vacuum cleaners have been available to provide on-spot cleaning in residence or in automobiles. However, most such products cannot deliver full power performance of a standard full-size upright or canister vacuum.

SUMMARY

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

One or more embodiments relate to a portable vacuum cleaner which offers superior portability as well as full power approximately equal to a standard full size vacuum.

Furthermore, one or more embodiments relate to a portable vacuum cleaner which may provide vacuum force through an inlet at the bottom of its charging base. Therefore, the portable vacuum cleaner with the charging base may function similar to a household dustpan.

To facilitate handling of the portable vacuum cleaner, one or more embodiments of a portable vacuum cleaner may employ a concealed hose and a retractable cord. To meet various cleaning demands, the portable vacuum cleaner may operate with different function modes, which may include, for example, a dustpan mode, in which vacuum force may be provided through a port at the bottom of the vacuum body, for planar surface vacuuming, and a cordless portable mode for on-spot vacuuming. Furthermore, the portable vacuum cleaner may employ multiple power supplies, such as, for example, an internal battery supply, wall power supply, or car power supply, etc.

The foregoing described problems may be overcome and/or other aspects may be achieved by one or more embodiments of a vacuum cleaner system that may include a vacuum body having an internal dust collector compartment, the vacuum body providing a vacuum force, and a charging base having a dirt inlet at the bottom, the charging base configured to house the vacuum body. The vacuum force may collect dirt through the dirt inlet on the charging base and may keep dirt in the internal dust collector compartment.

The charging base may include a first electrical connector and the vacuum body may include a second electrical connector to be connected to the first electrical connector of the charging base so as to supply electrical power from the charging base to the vacuum body.

The vacuum body may include a battery.

The vacuum body may receive electrical power from a wall outlet.

The vacuum body may receive electrical power from an automobile power supply.

The vacuum body may include a concealed hose.

The charging base may include a dustpan port and the vacuum body may include a trap door. When the vacuum cleaner is housed in the charging base, the dustpan port may force open the trap door so that the vacuum force may be routed to the dirt inlet on the charging base.

The foregoing described problems may be overcome and/or other aspects may be achieved by one or more embodiments of a vacuum cleaner that may include a vacuum body having an internal dust collector compartment, the vacuum body providing a vacuum force, and a dirt inlet at the bottom of the vacuum body. The vacuum force may collect dirt through the dirt inlet at the bottom of the vacuum body and may keep dirt in the internal dust collector compartment.

The vacuum body may include a battery.

The vacuum body may receive electrical power from a wall outlet.

The vacuum body may receive electrical power from an automobile power supply.

The vacuum body may include a concealed hose.

The foregoing described problems may be overcome and/or other aspects may be achieved by one or more embodiments of a vacuum cleaner charging base to accommodate a vacuum cleaner body, where the charging base may include a dirt inlet at the bottom of the charging base. A vacuum force provided by the vacuum cleaner body may collect dirt through the dirt inlet.

The vacuum cleaner charging base may include a dustpan port. When the vacuum cleaner body is accommodated in the charging base, the dustpan port may force open a trap door on the vacuum cleaner body so that the vacuum force may be routed to the dirt inlet on the charging base.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION

Figure 1:
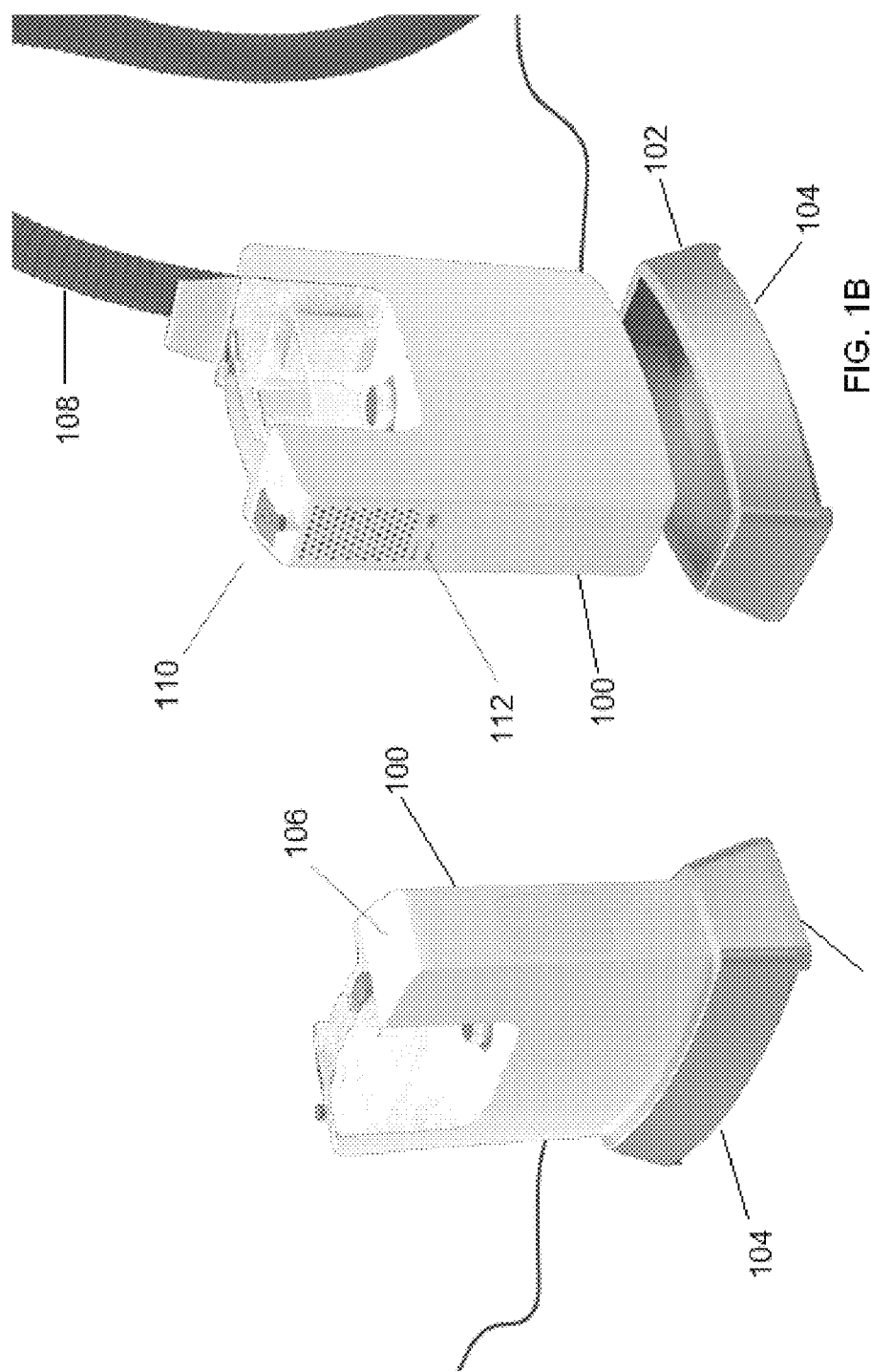
FIG. 1A is a perspective view of a full power portable vacuum cleaner according to one or more embodiments in a dustpan mode.
FIG. 1B is a perspective view of a full power portable vacuum cleaner according to one or more embodiments in a cordless portable mode.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

One or more embodiments provide a full power portable vacuum cleaner which may provide suction force through an inlet at the bottom of its charging base.

In the following description, Numerous specific details will be set forth to provide a thorough description of one or more embodiments. However, it will be apparent to those skilled in the art that embodiments may be practiced without these specific details. In other instances, well-known features have not been described in as much detail so as not to obscure aspects of then embodiments.

The size of a full power portable vacuum cleaner may be small to possibly facilitate portability, for example, about 15×11×4.5 inches. The weight of the portable vacuum cleaner may be within a range for an adult to maneuver, for example, about 10-18 Lbs. The portable vacuum cleaner may offer vacuum power approximately equal to a standard full-size upright or canister vacuum, for example, about 720 watts.

The full power portable vacuum cleaner may employ multiple power supplies, including, for example, an internal battery supply, wall power supply, or car power supply, etc.

The full power portable vacuum may employ a retractable cord system 112 to facilitate handling.

FIG. 1A is a perspective view of a portable vacuum cleaner 100 when it sits within a charging base 102, according to one or more embodiments.

The portable vacuum cleaner 100 may include a control panel 110 that may include power, power control and cord retract controls, a door to conceal the concealed hose 108, and a retractable cord 112.

The charging base 102 may function as a charging station for the portable vacuum cleaner 100. The charging base 102 may have a dirt inlet 104 at the bottom that may be connected to a vacuum force that may be generated by a DC motor 214 and, thus, may also function as a dirt collector. When the charging base 102, along with the inserted portable vacuum cleaner 100, is placed in a destination area, dirt nearby the destination area may be removed by vacuum force through a dirt inlet 104 at the bottom of the charging base 102. In addition, a user may use a broom to collect dirt around the destination area and feed the dirt into the dirt inlet 104. Thus, because the charging base 102 may operate similar to a household dustpan, this operation mode of the portable vacuum cleaner 100 is hereby referred as the dustpan mode.

FIG. 1B is a perspective view of a portable vacuum cleaner 100 when released from a charging base 102, according to one or more embodiments.

When the portable vacuum cleaner 100 is released from the charging base 102, the portable vacuum cleaner 100 may be used as a handheld vacuum cleaner which may provide on-spot vacuum cleaning in miscellaneous applications, such as, for example, automobile cleaning, sofa cleaning, ceiling cleaning, etc. The light weight and small size of the portable vacuum cleaner 100 may facilitate the user's handling of the portable vacuum cleaner 100.

The vacuum power of the portable vacuum cleaner 100 may enable the user to clean stains at the destination area. As shown in FIG. 1B, the portable vacuum cleaner 100 may provide a concealed hose 108 to extend the reach of the portable vacuum cleaner 100 The operation mode in which the portable vacuum cleaner 100 operates without the charging base 102 is hereby referred as the cordless portable mode.

Figure 2:
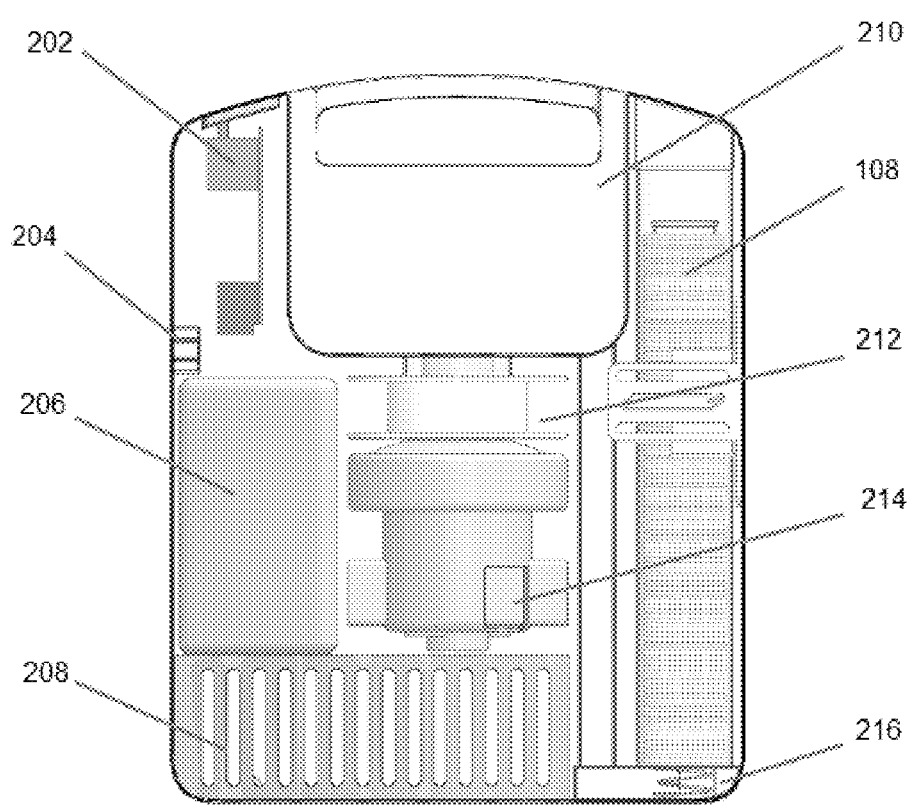
FIG. 2 is a sectional view of a full power portable vacuum cleaner according to one or more embodiments, such as the full power portable vacuum cleaner shown in FIG. 1A and FIG. 1B.

FIG. 2 is a sectional view of an embodiment of the full power portable vacuum cleaner 100 as seen in FIGS. 1A and 1B. The housing of a full power portable vacuum cleaner 100 may contain a control PCB (printed circuit board) 202, a DC connection 204, a DC battery pack 206, a power supply 208, a dust collector compartment 210, a concealed hose 108, a retractable cord reel 212, a DC motor 214, and a spring loaded valve 216 for the dustpan.

Figure 3:
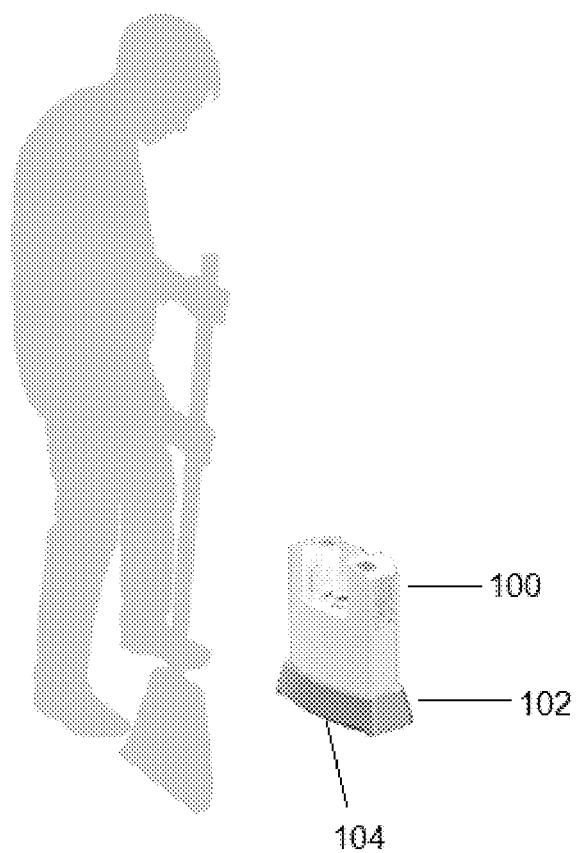
FIG. 3 is an in-use view of a full power portable vacuum cleaner according to one or more embodiments in a dustpan mode, such as the full power portable vacuum cleaner shown in FIG. 1A.

FIG. 3 illustrates the full power portable vacuum cleaner 100 in the dustpan mode. Being placed on a planar surface, the portable vacuum cleaner 100 with the charging base 102 may operate similar to a dustpan: a user may use a broom, for example, to sweep dirt into the bottom of the charging base 102, where the suction force may take up the dirt through a dirt inlet 104 on the charging base 102 and may hold the dirt in a dust collector compartment 210 within the portable vacuum cleaner 100.

Figure 4:
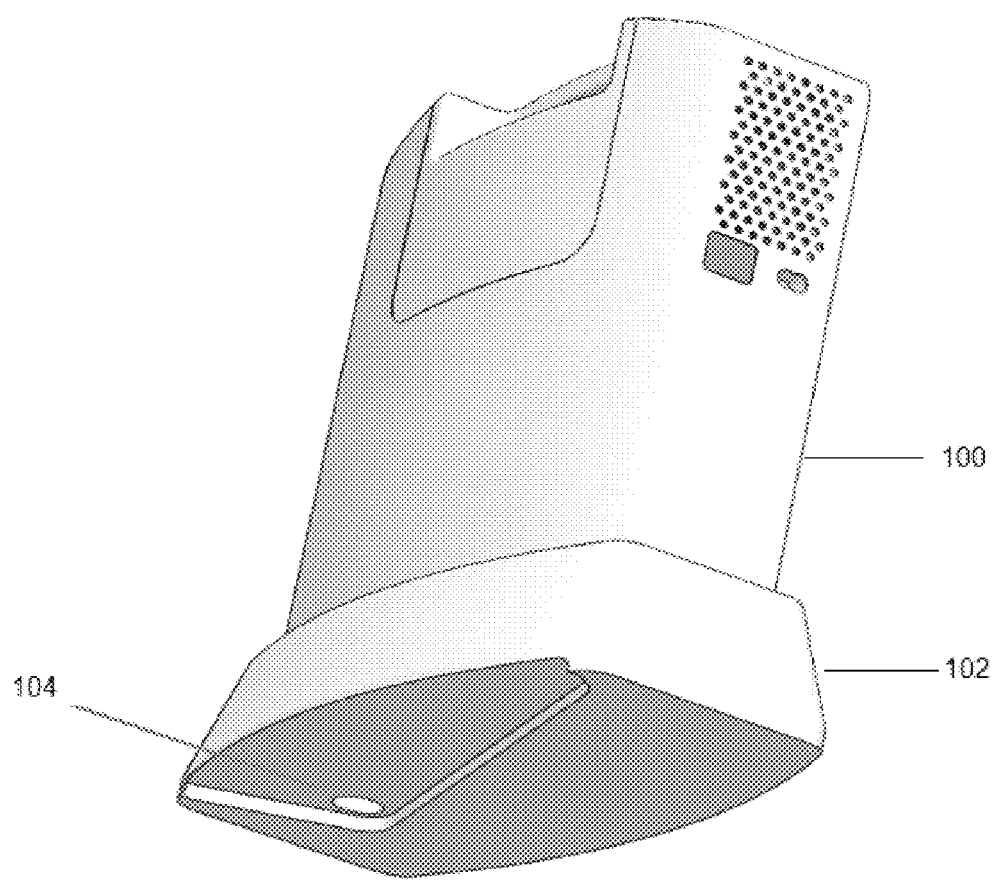
FIG. 4 is a bottom view of a full power portable vacuum cleaner according to one or more embodiments in a dustpan mode, such as the full power portable vacuum cleaner shown in FIG. 1A.

FIG. 4 is a bottom view of a full power portable vacuum cleaner 100 as seen in FIG. 1A.

A dirt inlet 104 at the bottom of the charging base 102 may connect to a suction force that may be generated by a DC motor 214.

Figure 5:
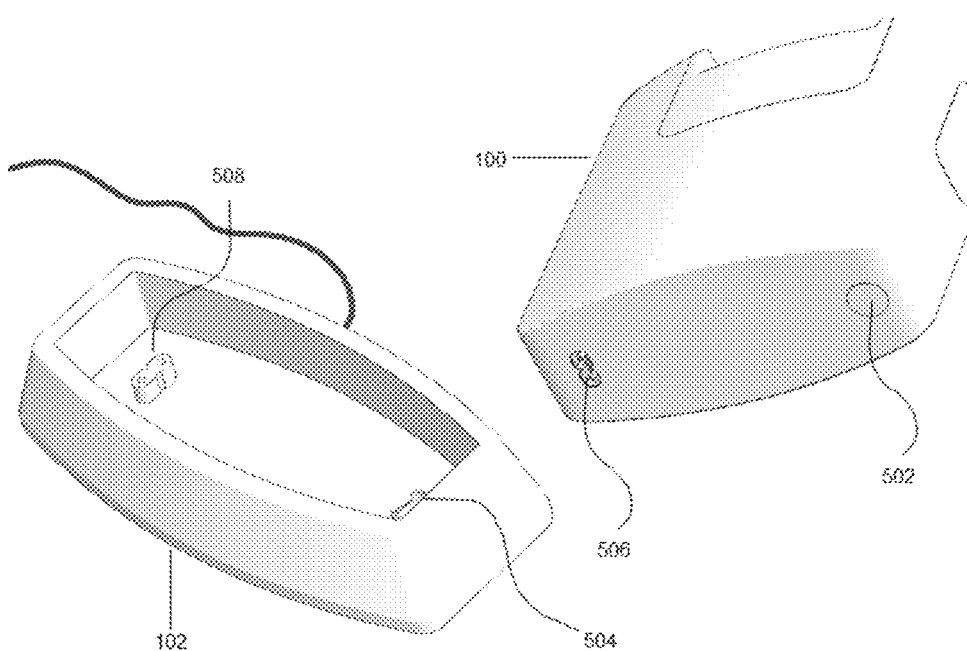
FIG. 5 is another perspective view of a full power portable vacuum cleaner according to one or more embodiments, such as the full power portable vacuum cleaner shown in FIG. 1A, depicting a changing station.

FIG. 5 is a perspective view of a full power portable vacuum cleaner 100 as seen in FIG. 1A.

FIG. 5 shows inter-connections between a full power portable vacuum cleaner 100 and a charging base 102. The portable vacuum cleaner 100 may slide into the charging base 102 to facilitate charging and handling. FIG. 5 shows the suction force of the charging base 102 may be furnished by the portable vacuum cleaner 100 through a vacuum port 502 that may be provided at the bottom of the portable vacuum cleaner 100 and a dust pan port 504 that may be provided on the charging base 102.

The portable vacuum cleaner 100 may further include a female electrical connector 506 that may receive a male electrical connector 508 that may be provided on the charging base 102.

Figure 6A:
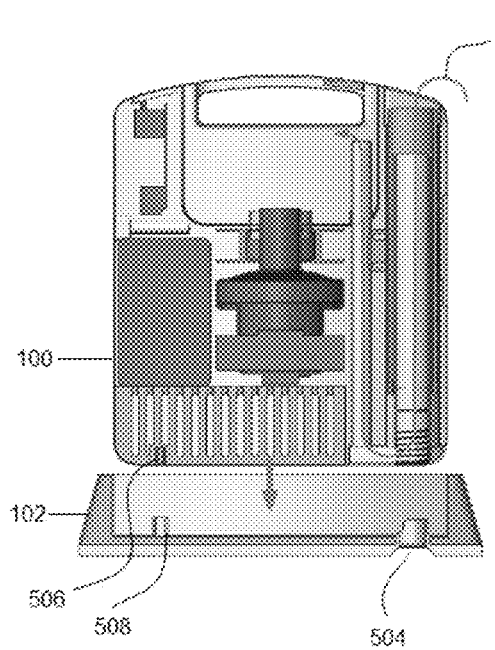
FIG. 6A is a sectional view of a full power portable vacuum cleaner according to one or more embodiments, such as the full power portable vacuum cleaner shown in FIG. 1A and 1B.
Figure 6B:
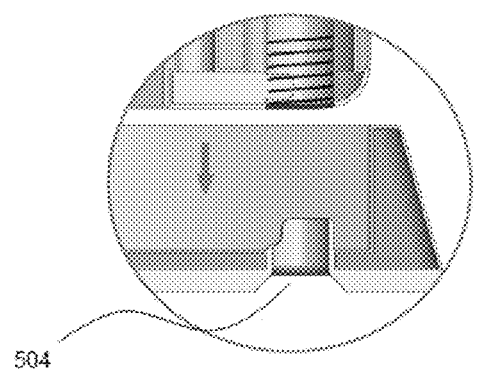
FIG. 6B and FIG. 6C are partial exploded views of a full power portable vacuum cleaner according to one or more embodiments.
Figure 6C:
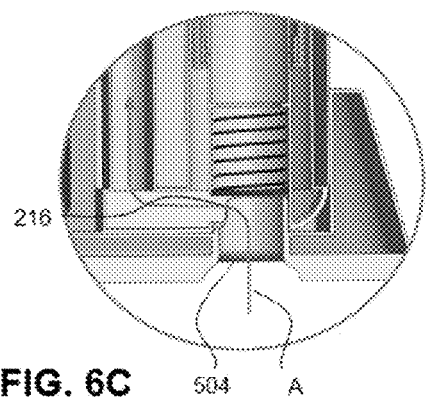

FIG. 6A is a sectional view of a full power portable vacuum cleaner 100 as seen in FIGS. 1A and 1B; FIG. 6B and FIG. 6C are the partial exploded views of a full power portable vacuum cleaner 100. The arrow A in FIG. 6C depicts the vacuum path for the dustpan mode from the dustpan port 504 located on the bottom of the charging base 102 to the dust collector compartment 210. The arrow B in FIG. 6A depicts the vacuum path for the cordless portable mode.

FIG. 6A illustrates automatically switching the portable vacuum cleaner 100 between the dustpan mode and the cordless portable mode. When the portable vacuum cleaner 100 is released from the charging base 102, the portable vacuum cleaner 100 may conduct the suction force through a hose 108, which may provide suction force for vacuuming in the cordless portable mode. When the portable vacuum cleaner 100 is inserted into the charging base 102, a dustpan port 504 may push open a spring loaded valve 216 to route the suction force into the charging base 102, thus possibly providing suction force for vacuuming in the dustpan mode. When the portable vacuum cleaner 100 is released from the charging base 102, the portable vacuum cleaner 100 may still conduct the suction force through a vacuum port 502 at the bottom of the portable vacuum cleaner 100. Thus, the portable vacuum cleaner 100 may still operate similar to a dustpan, even without a charging base 102.

Figure 7:
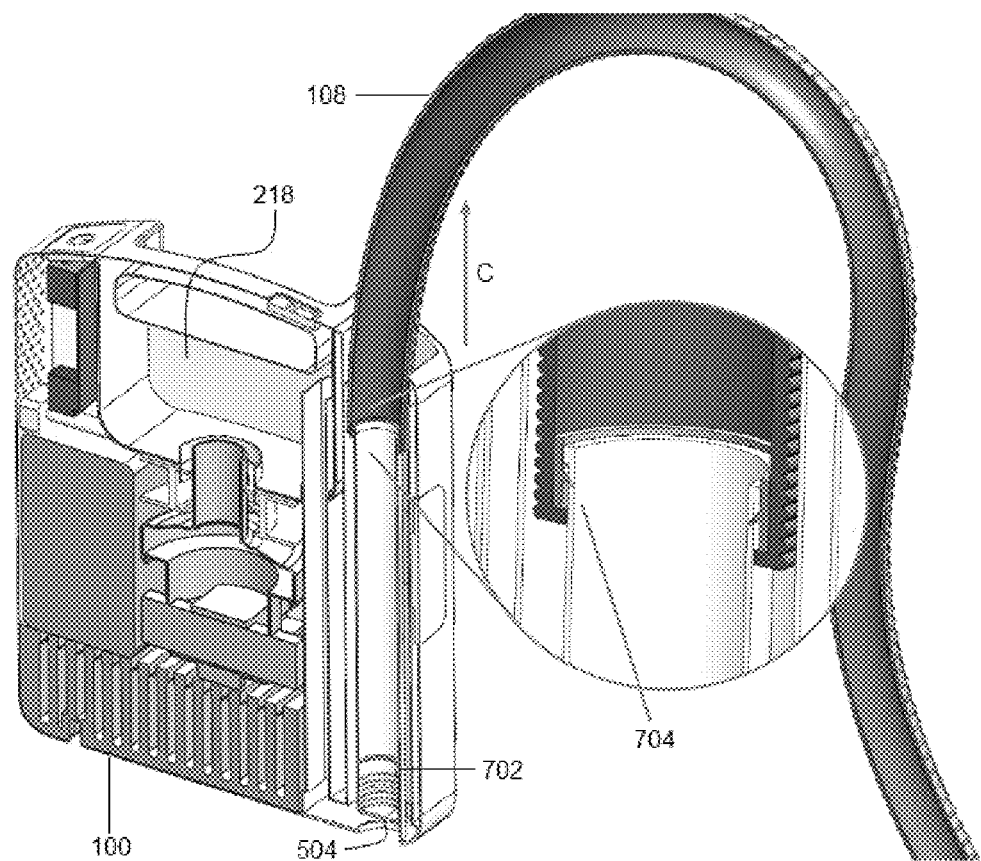
FIG. 7 is a sectional view with a partial exploded view of a full power portable vacuum cleaner according to one or more embodiments in a cordless portable mode, such as the full power portable vacuum cleaner shown in FIG. 1B.

FIG. 7 is a sectional view with a partial exploded view of an embodiment of the portable vacuum cleaner 100 as seen in FIG. 1B.

When the full power portable vacuum cleaner 100 is released from the charging base 102, or, operates in the cordless portable mode, a certain length of a concealed flexible hose 108 may be extended in direction C by sliding over an internal rigid tube 702 encompassed by the concealed flexible hose 108 through a radial seal 704, which may prevent air leakage between the internal rigid tube 702 and the concealed flexible hose 108. Such a hose storage mechanism may promote convenient hose storage as well as handling because of an elongated hose 108.

Figure 8:
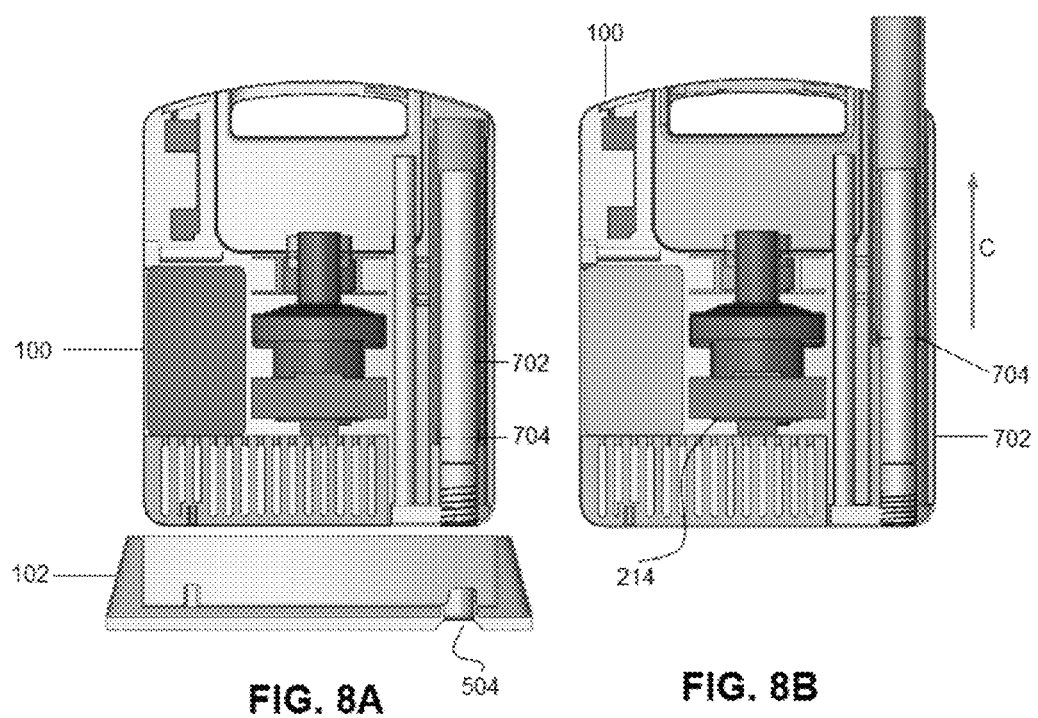
FIG. 8A and FIG. 8B are sectional views of a mechanism to deploy a concealed hose according to one or more embodiments, such as a mechanism of the full power portable vacuum cleaner shown in FIG. 7.

FIGS. 8A and 8B are sectional views of a hose storage mechanism to deploy the hidden hose 108 in FIG. 7.

As seen in FIG. 8A, when the portable vacuum cleaner 100 sits within the charging base 102, or, operates in the dustpan mode, a certain length of concealed flexible hose 108 encompasses an internal rigid tube 702 through a radial seal 704 which prevents the air leakage between the internal rigid tube and the hidden concealed hose 108. In FIG. 8B, in one embodiment, when the portable vacuum cleaner 100 is released from the charging base 102, or, operates in the cordless portable mode, the certain length of the hidden concealed hose 108 may be extended from the internal rigid tube 702 in direction C. Thus, the extended hose 108 may enhance enhances the user's ability to reach certain areas which are usually difficult to access, such as, for example, ceilings, back of a sofa, etc.

Figure 9:
FIG. 9 and FIG. 10 are in-use views of a full power portable vacuum cleaner according to one or more embodiments in a cordless portable mode, such as the full power portable vacuum cleaner shown in FIG. 1B.
Figure 10:
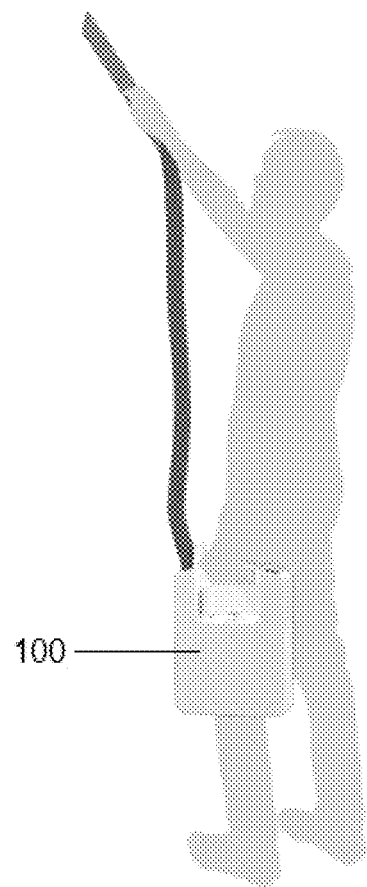

FIGS. 9 and 10 are different in-use views of a portable vacuum cleaner 100.

In FIG. 9, due to its portability, a user may carry the portable vacuum cleaner 100 to a desired location, such as, for example, in an automobile, at a backyard, etc. In such applications, the portable vacuum cleaner 100 may be powered, for example, from an internal battery, or alternatively, powered by an automobile's electrical outlet.

In FIG. 10, a user may use the full power portable vacuum cleaner 100 to clean areas which may be hard to access by a standard full-size vacuum cleaner, such as, for example, a ceiling, or a sofa corner. In such applications, the portable vacuum cleaner 100 may be powered, for example, from an internal battery, or alternatively, powered directly from a wall outlet.

Figure 11:
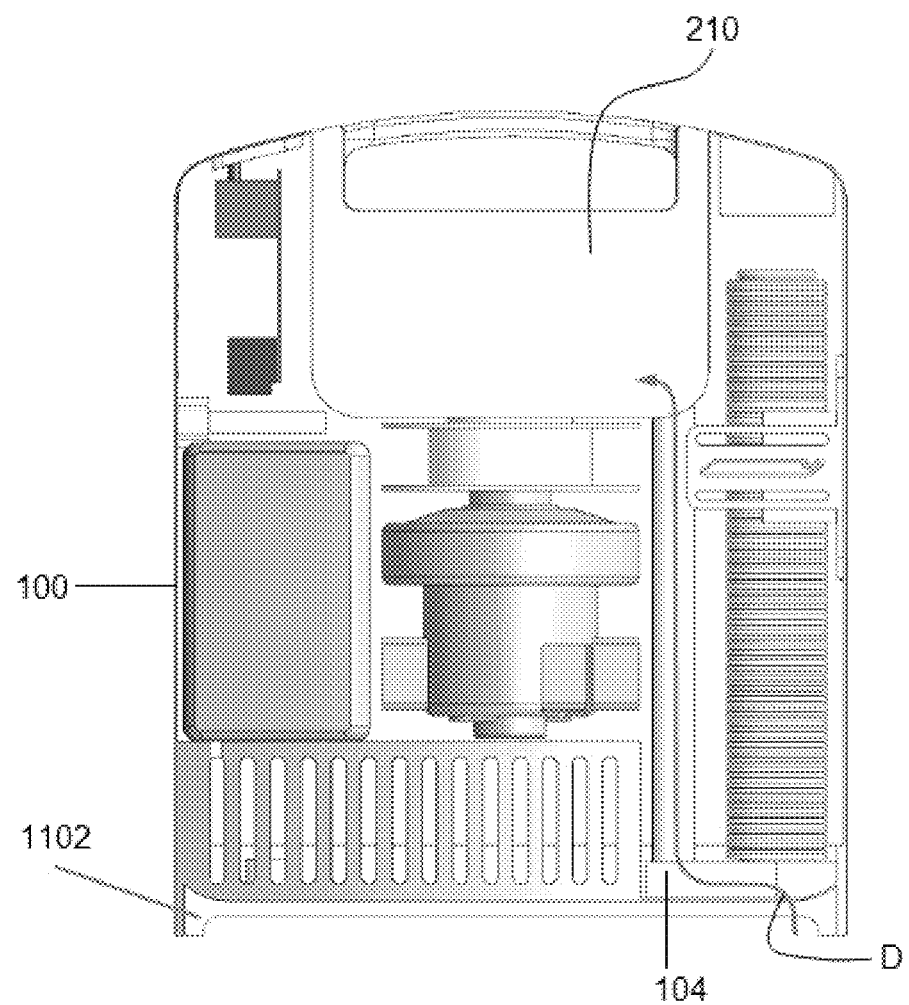
FIG. 11 is a sectional view of a full power portable vacuum cleaner according to one or more embodiments.

FIG. 11 is a sectional view of a full power portable vacuum cleaner 100, wherein the "dustpan" function is incorporated into the portable vacuum cleaner 100.

In FIG. 11 when the portable vacuum cleaner 100 is released from the charging base 102, the suction path may still conduct suction force via path D through a dirt inlet 104 and an integrated dustpan 1102 at a bottom of the portable vacuum cleaner 100. Thus, the portable vacuum cleaner 100, by itself, may remove dirt at the bottom of the portable vacuum cleaner 100 and may operate similar to a household dustpan.

Figure 12:
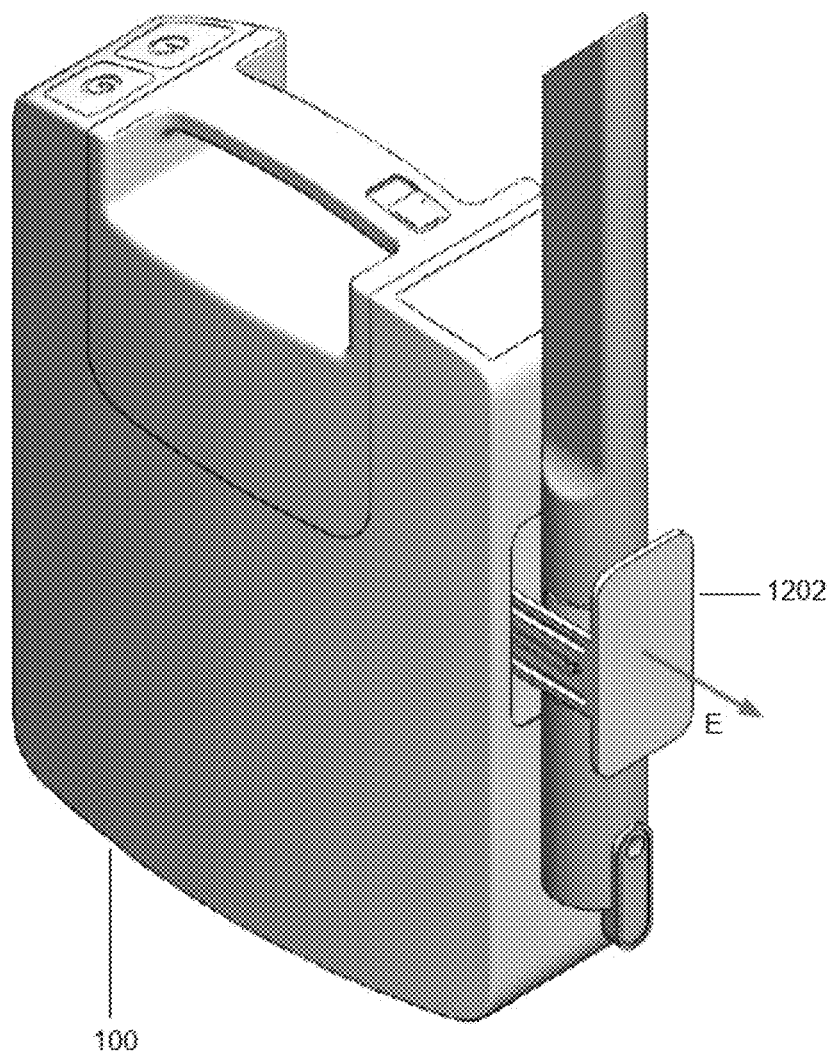
FIG. 12 is a perspective view of a full power portable vacuum cleaner according to one or more embodiments including a pop-out accessory holder.

FIG. 12 is a perspective view of a full power portable vacuum cleaner according to one or more embodiments including a pop-out accessory holder.

In FIG. 12, the full power portable vacuum cleaner may include a pop-out accessory holder 1202. The accessory holder may, for example, be extended by pressing the accessory holder two times and may be hidden by pressing the accessory holder one time.

Figure 13:
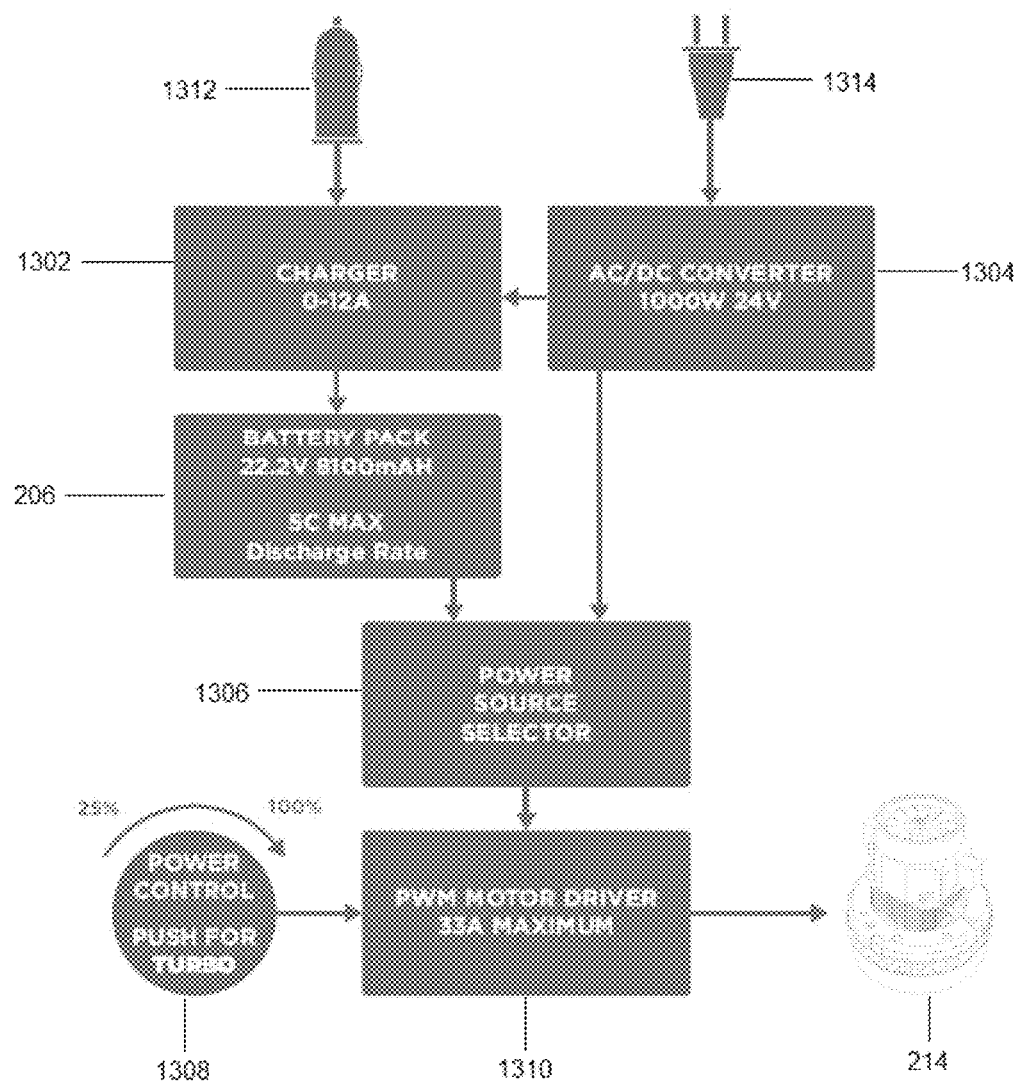
FIG. 13 is a schematic diagram illustrating electrical connections and controls of a full power portable vacuum cleaner according to one or more embodiments.

FIG. 13 is a schematic diagram illustrating electrical connections and controls of a full power portable vacuum cleaner according to one or more embodiments.

The full power portable vacuum cleaner may receive electrical power, for example, from an automobile power adapter 1312 or a wall plug 1314. Electrical power from the automobile power adapter 1312 may be transmitted to a charger 1302. Electrical power from the wall plug 1314 may be transmitted to an AC/DC converter 1304 before being be transmitted to the charger 1302. Electrical power from the charger 1302 may be transmitted to the battery 206. A power source selector 1306 may select between power transmitted from the battery 206 or the AC/DC converter 1304. Electrical power from the power source selector 1306 may be transmitted to a motor driver 1310, which may transmit electrical power to the motor 214. The motor driver 1310 may be controlled by a power control 1308, which may allow for control of an amount of electrical power to be transmitted to the motor 214 (for example, in a range between about 25% and about 100% of full power) and may allow for a turbo mode providing additional electrical power.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A vacuum cleaner system comprising:
   a vacuum body having an internal dust collector compartment, the vacuum body providing a vacuum force;
   a charging base having a dirt inlet at a bottom of the charging base, the charging base configured to house the vacuum body; and
   wherein the vacuum force collects dirt through the dirt inlet on the charging base and keeps the dirt in the internal dust collector compartment.

2. The vacuum cleaner system according to claim 1,
   wherein the charging base further comprises a first electrical connector and the vacuum body further comprises a second electrical connector to be connected to the first electrical connector of the charging base so as to supply electrical power from the charging base to the vacuum body.

3. The vacuum cleaner system according to claim 1,
   wherein the vacuum body further comprises a battery.

4. The vacuum cleaner system according to claim 1,
   wherein the vacuum body receives electrical power from a wall outlet.

5. The vacuum cleaner system according to claim 1,
   wherein the vacuum body receives electrical power from an automobile power supply.

6. The vacuum cleaner system according to claim 1,
   wherein the vacuum body further comprises a concealed hose.

7. The vacuum cleaner system according to claim 1,
   wherein the charging base further comprises a dustpan port and the vacuum body further comprises a trap door, and
   wherein when the vacuum body is housed in the charging base, the dustpan port forces open the trap door so that the vacuum force is routed to the dirt inlet on the charging base.

8. A vacuum cleaner comprising:
   a vacuum body having an internal dust collector compartment, the vacuum body providing a vacuum force;
   a dirt inlet at a bottom of the vacuum body; and
   wherein the vacuum force collects dirt through the dirt inlet at the bottom of the vacuum body and keeps the dirt in the internal dust collector compartment,
   wherein the vacuum body further comprises an internal rigid tube and an extendable hose, which surrounds the internal rigid tube, that is concealed within the vacuum body when retracted.

9. The vacuum cleaner according to claim 8,
   wherein the vacuum body further comprises a battery.

10. The vacuum cleaner according to claim 8,
    wherein the vacuum body receives electrical power from a wall outlet.

11. The vacuum cleaner according to claim 8,
    wherein the vacuum body receives electrical power from an automobile power supply.

12. A vacuum cleaner charging base to accommodate a vacuum cleaner body, the charging base comprising:
    a dirt inlet at the bottom of the charging base,
    wherein a vacuum force provided by the vacuum cleaner body collects dirt through the dirt inlet.

13. The vacuum cleaner charging base according to claim 12, further comprising a dustpan port,
    wherein when the vacuum cleaner body is accommodated in the charging base, the dustpan port forces open a trap door on the vacuum cleaner body so that the vacuum force is routed to the dirt inlet on the charging base.

14. The vacuum cleaner system according to claim 1,
    wherein the vacuum body further includes a motor to provide the vacuum force, and
    wherein the vacuum body and charging base are configured to allow the dirt to flow, from outside the charging base and outside the vacuum body, through the dirt inlet of the charging base through the charging base to the vacuum body when the vacuum force is applied and when the vacuum body is attached to the charging base.

* * * * *